C. D. FAUST.
CORN PLANTER ATTACHMENT.
APPLICATION FILED MAR. 22, 1918.
1,317,282. Patented Sept. 30, 1919.
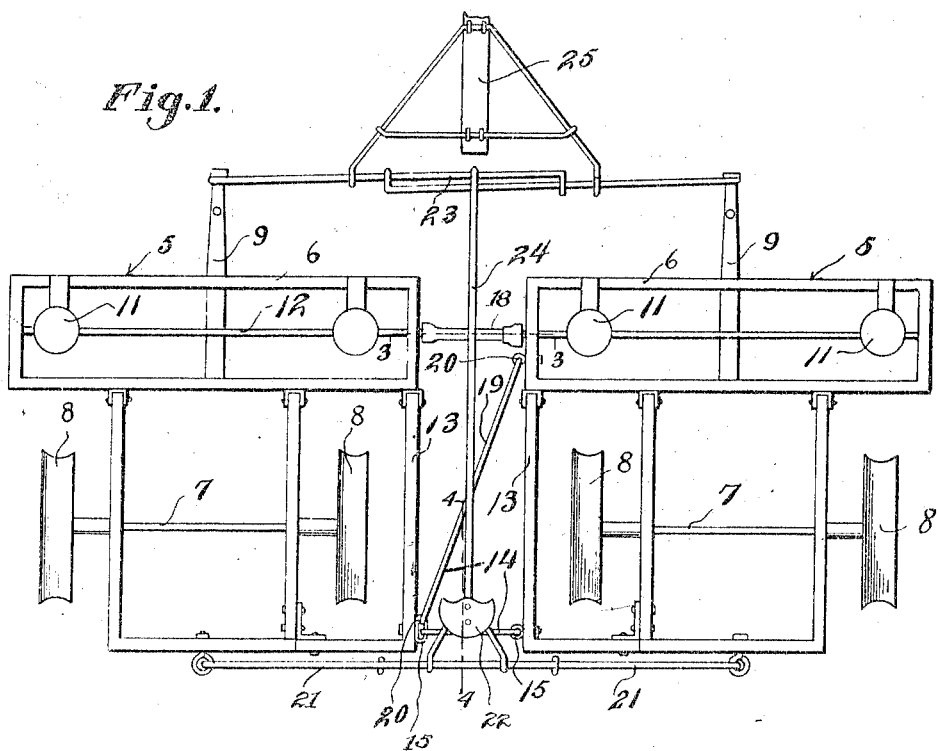
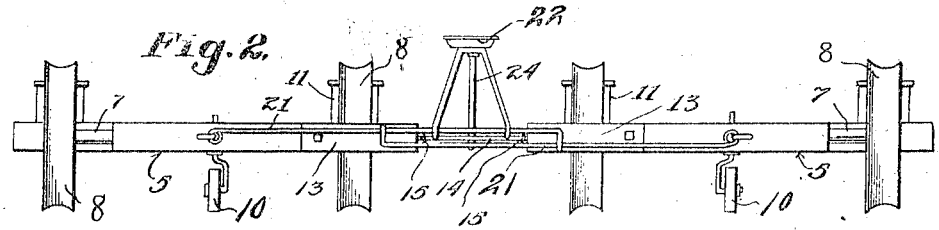
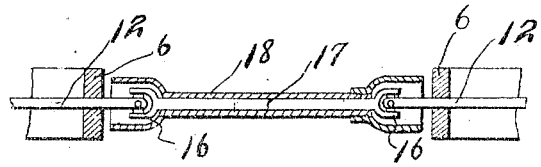
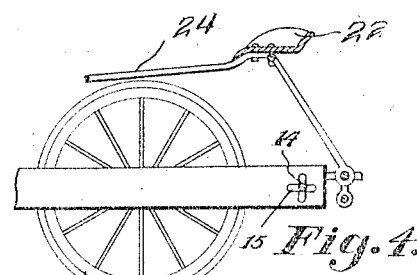
Inventor
C. D. Faust

UNITED STATES PATENT OFFICE.

CLARENCE D. FAUST, OF CULLOM, ILLINOIS.

CORN-PLANTER ATTACHMENT.

1,317,282.   Specification of Letters Patent.   Patented Sept. 30, 1919.

Application filed March 22, 1918. Serial No. 223,973.

*To all whom it may concern:*

Be it known that I, CLARENCE D. FAUST, a citizen of the United States, residing at Cullom, in the county of Livingston, State of Illinois, have invented certain new and useful Improvements in Corn-Planter Attachments; and I do hereby declare the following to be a full, clear, and exact description of the invention, such as will enable others skilled in the art to which it appertains to make and use the same.

This invention is an improvement in agricultural machines and has particular reference to a corn planter.

An object of the invention is to provide improved means of simple and inexpensive construction for joining a pair of corn planters of ordinary construction whereby to convert the same into a four row planter.

The inventive idea involved is capable of receiving a variety of mechanical expressions one of which, for the purpose of illustrating the invention, is shown in the accompanying drawing, wherein:—

Figure 1 is a top plan view of two corn planters of known construction connected by the improved mechanism.

Fig. 2 is a rear elevation thereof.

Fig. 3 is a section on the line 3—3 of Fig. 1.

Fig. 4 is a section on the line 4—4 of Fig. 1.

In the use of the present invention, a pair of corn planters 5 are employed and, as shown, each planter consists generally of a frame 6 having a rear axle 7 upon which are mounted the usual wheels 8 and extending from the forward portion of the frame is a draft bar 9 supported by a caster wheel 10. Each planter further includes the seed hoppers 11 and dropping mechanisms (not shown) which are operated by the usual shaft 12 driven from the axle 7 or one of the wheels 8 as not necessary to illustrate in detail. It will be understood, of course, that any form of planter desired other than that shown herein may be employed as the particular construction of the planter forms no part of the present invention.

The construction which comprises the essential features of the invention preferably contemplates the provision of an auxiliary frame 13 for each planter 5 hingedly attached to the rear portion of the main frame and disposed adjacent the auxiliary frame 13 of the other planter in spaced relation thereto, said frames being held in such relation and substantially parallel to each other by a link connection 14 pivoted at each end to the rear end of the adjacent frame 13, as indicated at 15, to permit relative movements of the planters as when passing over uneven ground.

The shafts 12 have their inner ends connected, by universal joints 16, to the intermediate shaft 17 whereby the dropping mechanisms of the several hoppers 11 will operate in unison and said shaft 17 is inclosed by a sleeve 18 between frames 6 whereby to aid in maintaining the same in proper spaced relation. The inner end of the frame 6 of one of the planters is connected to the auxiliary frame 13 of the other planter by means of a diagonal brace 19 having its ends pivoted, as at 20, to the adjacent parts.

The rear ends of the frames 6 are joined by a sectional rod 21 the inner ends of the sections of which are connected and support a seat 22, and said sections are relatively adjustable or slidable on each other to permit of varying the distance between the planters. The forward ends of the draft bars 9 are also joined by a sectional rod 23, the sections of which are slidably connected so as to render the same adjustable when varying the distance between the planters and if such variation becomes necessary the elements 14, 17, 18, and 19 will be replaced by others of proper length, but the sectional rods 21 and 23 will telescope to adjust themselves. The seat 22 is connected to the rod 23 by a brace rod 24. A main draft bar or tongue 25 is pivoted to the sections of the rod 23 so that the planters may be drawn by a tractor or draft animals.

From the foregoing description, taken in connection with the accompanying drawing, it will be apparent that the invention provides a simple and inexpensive attachment for corn planters whereby a pair of the same may be connected to form a four row planter.

What is claimed is:

1. In an agricultural machine, the combination with a pair of planters including frames, draft bars therefor, and shafts for operating the dropper mechanisms therefor; of a connection between the frames of the planters, an intermediate shaft pivoted to adjacent ends of the shafts for operating the dropper mechanisms whereby the latter are actuated in unison, an adjustable connection between the rear ends of the said frames, a similar connection between said draft bars, and a main draft tongue pivoted to the last named connection.

2. Means for coupling corn planters side by side comprising auxiliary frames connected to the planter frames and standing parallel with each other, a link connecting the auxiliary frames at their rear ends, an intermediate shaft and universal joints connecting the dropper shafts, a diagonal brace between the auxiliary frames and pivotally connecting one of them with the opposite planter frame, and draft mechanism connecting the draft bars of the planters.

3. Means for coupling corn planters side by side comprising auxiliary frames connected to the planter frames and standing parallel with each other, a link connecting the auxiliary frames at their rear ends, an intermediate shaft and universal joints connecting the dropper shafts, a diagonal brace between the auxiliary frames and pivotally connecting one of them with the opposite planter frame, cross rods pivotally connecting the rear ends of the planters and the draft bars thereof, a seat mounted on the rear rod and braced from the front rod, and draft mechanism attached to the front rod.

In testimony whereof, I affix my signature, in the presence of two witnesses.

CLARENCE D. FAUST.

Witnesses:
CHARLES F. SHAFER,
J. M. FISCHER.